United States Patent
Kothuru et al.

(10) Patent No.: US 11,264,801 B2
(45) Date of Patent: Mar. 1, 2022

(54) LOAD MANAGEMENT ALGORITHM FOR OPTIMIZING ENGINE EFFICIENCY

(71) Applicant: Schlumberger Technology Corporation, Sugar Land, TX (US)

(72) Inventors: Seetharam Kothuru, Houston, TX (US); Shyam Janakiraman, Houston, TX (US); Ramakrishna Madhireddy, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 274 days.

(21) Appl. No.: 15/903,417

(22) Filed: Feb. 23, 2018

(65) Prior Publication Data
US 2019/0267805 A1    Aug. 29, 2019

(51) Int. Cl.
| | | |
|---|---|---|
| *H02J 3/14* | (2006.01) | |
| *H02J 3/46* | (2006.01) | |
| *H02J 13/00* | (2006.01) | |
| *H02J 3/38* | (2006.01) | |

(52) U.S. Cl.
CPC .  *H02J 3/14* (2013.01); *H02J 3/46* (2013.01)

(58) Field of Classification Search
CPC .......... H02J 3/14; H02J 3/46; H02J 13/00002; H02J 3/381; Y02E 60/00; Y02E 40/70; Y04S 10/30; Y04S 10/50; Y04S 20/222; Y02B 70/3225
See application file for complete search history.

(56) References Cited

U.S. PATENT DOCUMENTS

| | | |
|---|---|---|
| 4,482,857 A | 11/1984 | Porche et al. |
| 5,950,953 A | 9/1999 | Baugh et al. |
| 6,639,331 B2 | 10/2003 | Schultz |
| 6,812,811 B2 | 11/2004 | Robison et al. |
| 6,913,097 B1 | 7/2005 | Orr et al. |
| 7,038,332 B2 | 5/2006 | Robison et al. |
| 7,137,586 B2 | 11/2006 | Talen |
| 7,210,647 B2 | 5/2007 | Dion |
| 7,447,051 B2 | 11/2008 | Masino et al. |
| 7,717,193 B2 | 5/2010 | Egilsson et al. |
| 7,819,209 B1 | 10/2010 | Bezner |
| 7,854,636 B2 | 12/2010 | Gilliam |

(Continued)

FOREIGN PATENT DOCUMENTS

| | | |
|---|---|---|
| CN | 106786786 A | 5/2017 |
| WO | 2017139631 A1 | 8/2017 |

(Continued)

OTHER PUBLICATIONS

Search Report issued in European Patent Application No. 19756682.1 dated Oct. 1, 2021; 7 pages.

*Primary Examiner* — Thomas C Lee
*Assistant Examiner* — Anzuman Sharmin
(74) *Attorney, Agent, or Firm* — Jeffrey D. Frantz

(57) ABSTRACT

Systems and methods for operating a series of generators configured to provide power to a motor or motors. Generators generally operate at different efficiency levels depending on the operating capacity. A computation component can analyze the current efficiency of the generators and determine if there is an alternative power distribution among the existing generators that would result in a more efficient operation of the system.

15 Claims, 5 Drawing Sheets

(56) References Cited

U.S. PATENT DOCUMENTS

| | | |
|---|---|---|
| 8,061,644 B1 | 11/2011 | Dion |
| 8,219,258 B1 | 7/2012 | Almeida et al. |
| 8,250,816 B2 | 8/2012 | Donnally et al. |
| 8,446,037 B2 | 5/2013 | Williams |
| 8,519,565 B2 | 8/2013 | Dozier et al. |
| 8,604,639 B2 | 12/2013 | Hopwood |
| 8,798,802 B2 | 8/2014 | Almeida et al. |
| 9,059,587 B2 | 6/2015 | Williams |
| 9,065,300 B2 | 6/2015 | Williams |
| 9,197,071 B2 | 11/2015 | Williams |
| 9,206,658 B1 | 12/2015 | Dion |
| 9,212,499 B1 | 12/2015 | Maurer |
| 9,240,687 B2 | 1/2016 | Carralero et al. |
| 9,450,433 B2 | 9/2016 | Di Cristofaro |
| 9,528,697 B2 | 12/2016 | Sonnervig et al. |
| 9,531,204 B2 | 12/2016 | Di Cristofaro |
| 9,535,410 B2 | 1/2017 | Di Cristofaro |
| 9,537,315 B2 * | 1/2017 | Kuttel .............. H02J 3/00 |
| 9,543,748 B2 | 1/2017 | Andersen et al. |
| 9,644,431 B2 | 5/2017 | Myers et al. |
| 9,670,767 B2 | 6/2017 | Hernandez et al. |
| 9,706,185 B2 | 7/2017 | Ellis |
| 9,726,003 B2 | 8/2017 | Pettapiece et al. |
| 9,732,604 B2 | 8/2017 | Haines et al. |
| 9,734,525 B2 | 8/2017 | Lunenfeld |
| 9,739,141 B2 | 8/2017 | Zeng et al. |
| 9,749,598 B2 | 8/2017 | Richardson et al. |
| 9,749,717 B2 | 8/2017 | White et al. |
| 9,759,025 B2 | 9/2017 | Vavik |
| 9,766,364 B2 | 9/2017 | Hickman |
| 9,777,570 B2 | 10/2017 | Braisher et al. |
| 9,784,097 B2 | 10/2017 | Dugas |
| 9,797,234 B1 | 10/2017 | Forstner et al. |
| 9,803,461 B2 | 10/2017 | Boone |
| 9,806,530 B2 | 10/2017 | Martinez |
| 9,810,055 B2 | 11/2017 | Hall |
| 9,819,292 B2 | 11/2017 | Thatcher et al. |
| 9,850,712 B2 | 12/2017 | Sugiura |
| 9,910,180 B2 | 3/2018 | Donderici et al. |
| 9,915,128 B2 | 3/2018 | Hunter |
| 9,938,780 B2 | 4/2018 | Begnaud |
| 10,017,993 B2 | 7/2018 | Hu et al. |
| 10,027,128 B2 | 7/2018 | Muller |
| 10,151,178 B2 | 12/2018 | Stephenson et al. |
| 2008/0203734 A1 | 8/2008 | Grimes et al. |
| 2009/0195074 A1 | 8/2009 | Buiel |
| 2009/0312885 A1 | 12/2009 | Buiel |
| 2010/0094490 A1 | 4/2010 | Alston et al. |
| 2010/0102637 A1 | 4/2010 | Dozier et al. |
| 2011/0148209 A1 | 6/2011 | Williams |
| 2011/0301888 A1 * | 12/2011 | Liberman .............. H02J 3/14 702/61 |
| 2013/0234515 A1 | 9/2013 | Boone |
| 2014/0290591 A1 * | 10/2014 | Filip .............. F02B 63/04 123/2 |
| 2014/0309797 A1 * | 10/2014 | Frampton .............. H02P 9/02 700/287 |
| 2014/0350744 A1 | 11/2014 | Almeida, Jr. et al. |
| 2015/0318698 A1 * | 11/2015 | Tani .............. H02J 3/46 700/287 |
| 2015/0372492 A1 | 12/2015 | Kuttel et al. |
| 2016/0036367 A1 | 2/2016 | McCall et al. |
| 2016/0036450 A1 * | 2/2016 | McCall .............. F04B 17/03 700/287 |
| 2016/0145947 A1 | 5/2016 | Myers et al. |
| 2016/0190963 A1 | 6/2016 | Thatcher et al. |
| 2017/0067303 A1 | 3/2017 | Thiemann et al. |
| 2017/0077705 A1 | 3/2017 | Kuttel et al. |
| 2017/0175447 A1 | 6/2017 | Gharib et al. |
| 2017/0184754 A1 | 6/2017 | Rozenblit et al. |
| 2017/0204690 A1 | 7/2017 | Hess et al. |
| 2017/0211338 A1 | 7/2017 | Myers et al. |
| 2017/0218745 A1 | 8/2017 | Erdos et al. |
| 2017/0229869 A1 | 8/2017 | Boone et al. |
| 2017/0241252 A1 | 8/2017 | Hernandez et al. |
| 2017/0270768 A1 | 9/2017 | Valleru |
| 2017/0298722 A1 | 10/2017 | Pettapiece et al. |
| 2017/0314369 A1 | 11/2017 | Rosano et al. |
| 2017/0321503 A1 | 11/2017 | Lane |
| 2017/0328193 A1 | 11/2017 | Holt et al. |
| 2017/0328196 A1 | 11/2017 | Shi et al. |
| 2017/0328197 A1 | 11/2017 | Shi et al. |
| 2017/0335683 A1 | 11/2017 | Pool |
| 2017/0342808 A1 | 11/2017 | Dykstra et al. |
| 2017/0370190 A1 | 12/2017 | Bagnaro |
| 2017/0370204 A1 | 12/2017 | Dahl |
| 2018/0012384 A1 | 1/2018 | Marland et al. |
| 2018/0023354 A1 | 1/2018 | Dion |
| 2018/0023381 A1 | 1/2018 | Xue et al. |
| 2018/0035566 A1 | 2/2018 | Held et al. |
| 2018/0066506 A1 | 3/2018 | Boone |
| 2018/0066513 A1 | 3/2018 | Sugiura et al. |
| 2018/0080286 A1 | 3/2018 | Begnaud |
| 2018/0123384 A1 | 5/2018 | Foo et al. |
| 2018/0175626 A1 | 6/2018 | Gerdes et al. |
| 2019/0048666 A1 | 2/2019 | Orban et al. |
| 2019/0048667 A1 | 2/2019 | Krippner et al. |
| 2019/0071966 A1 | 3/2019 | Orban |
| 2019/0115758 A1 | 4/2019 | Orban et al. |
| 2019/0128107 A1 | 5/2019 | Janakiraman et al. |
| 2019/0131905 A1 | 5/2019 | Janakiraman et al. |

FOREIGN PATENT DOCUMENTS

| | | |
|---|---|---|
| WO | 2017192814 A2 | 11/2017 |
| WO | 2017217905 A1 | 12/2017 |
| WO | 2018201118 A1 | 11/2018 |
| WO | 2018204293 A1 | 11/2018 |
| WO | 2018213925 A1 | 11/2018 |
| WO | 2019084530 A1 | 5/2019 |
| WO | 2019118352 A1 | 6/2019 |
| WO | 2019118477 A1 | 6/2019 |

* cited by examiner

LOAD MANAGEMENT ALGORITHM FOR OPTIMIZING ENGINE EFFICIENCY

BACKGROUND

Oil and gas drilling operations require significant quantities of power and control over that power. A typical drilling rig uses generators which consume fuel to create mechanical and electrical power which is then used to operate a drilling rig. Drilling itself consumes a large portion of the power required at the rig but there are many other components that all factor in. Managing the power created and consumed in an efficient way is a continuous challenge to a drilling operation.

SUMMARY

Various features of the present disclosure are described herein. Embodiments are directed to a system including a generator bank comprising a plurality of individual generators being configured to load share amongst the generators. Individual generators have an operating capacity and an operating efficiency. The operating efficiency is a function of the operating capacity, and an efficiency-capacity ratio is a ratio of the operating capacity and the operating efficiency. The system also includes one or more motors configured to consume the power produced by the generators by applying a load to the generator bank, and a computation component configured to store data relating to the efficiency-capacity ratio for the generators. The computation component is configured to calculate an overall efficiency of the generator bank, determine an availability of an alternative power configuration in which an operating capacity of one or more of the generators is changed, and calculate an expected change in the overall efficiency associated with the alternative power configuration. If the expected change in the overall efficiency is sufficiently high, the computation component is configured to initiate the alternative power configuration.

Further embodiments are directed to a method for operating a power unit of a drilling rig, including calculating an efficiency of a generator bank used to provide power to the drilling rig, the generator bank comprising one or more individual generators, and if the efficiency of the generator bank is less than a predetermined desired efficiency threshold, identifying an alternative power distribution for the generator bank. The method also includes calculating an efficiency of the alternative power distribution for the generator bank, and if the efficiency of the alternative power distribution for the generator bank is greater than the predetermined desired efficiency threshold, initiating a change to the alternative power distribution for the generator bank.

Still further embodiments of the present disclosure are directed to a method for operating a generator, including measuring power output, fuel consumption, and operating capacity at a plurality of generators. The generators are configured to operate together to provide power for a motor. The method also includes calculating an operating efficiency for each generator based at least in part upon the power output, fuel consumption, and operating capacity of each generator, and communicating the operating efficiency with a computation component. The method further includes receiving an instruction from the computation component to change load, power on, or power down one or more of the generators in response to the instruction.

DETAILED DESCRIPTION

Figure 1:
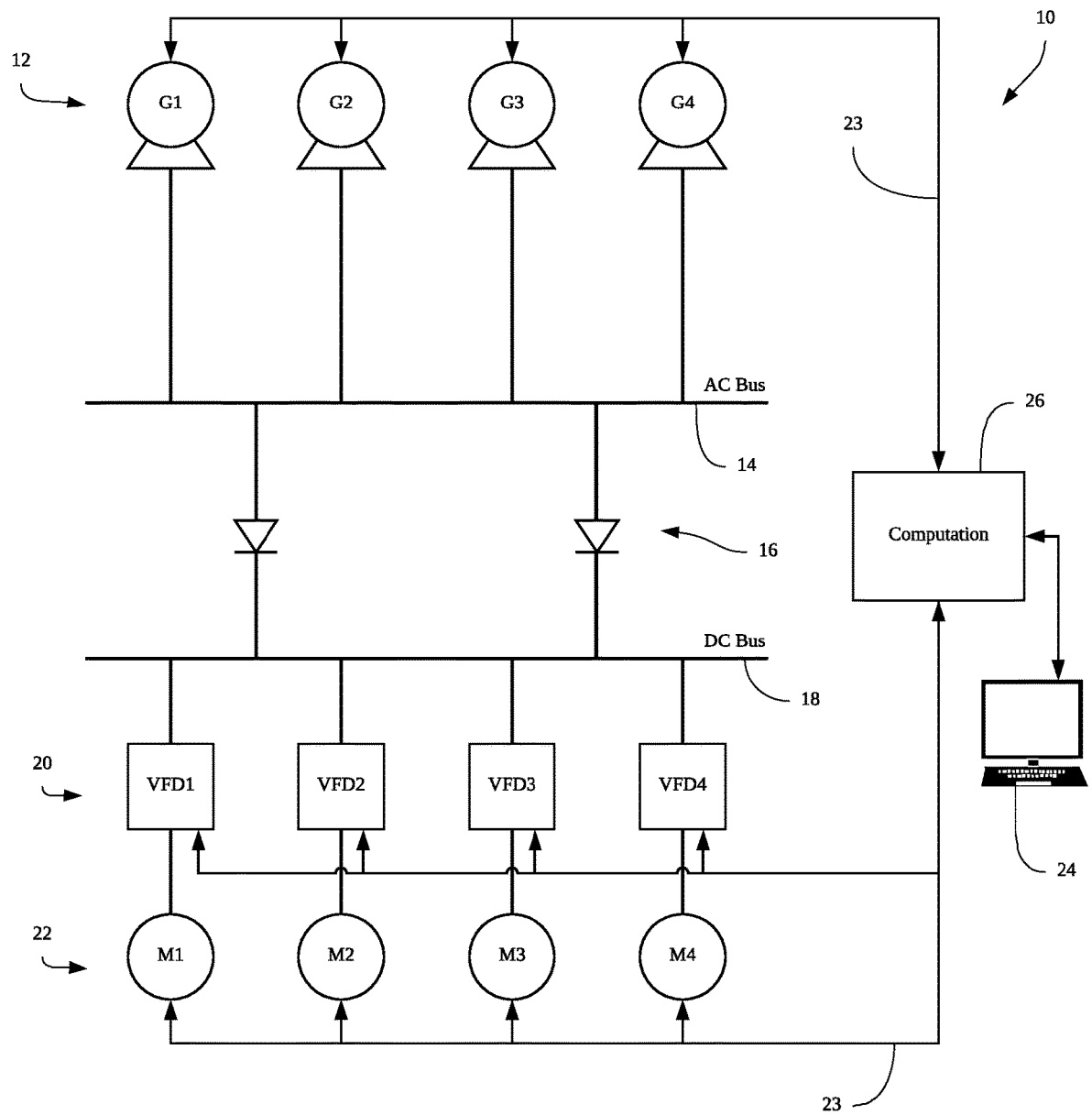
FIG. 1 is a schematic illustration of an engine automation architecture of a drilling system according to embodiments of the present disclosure.

Below is a detailed description according to various embodiments of the present disclosure. FIG. 1 is a schematic illustration of an engine automation architecture of a drilling system 10 according to embodiments of the present disclosure. The system 10 can be a drilling rig or another similar operation featuring the components described herein and is not limited to an oil and gas application. The system 10 includes generators shown as G1, G2, G3, and G4 although there could be any number of generators 12 in a given system. The generators 12 consume fuel and create electrical power and can be collectively referred to as a generator bank 12. The generators are connected to an AC bus 14 which helps to aggregate the power created by the generators and to convey the power elsewhere. The system 10 can include rectifiers 16 which are configured to transform the electrical power from AC to DC. The rectifiers 16 are also connected to a DC bus 18 which carries the DC power throughout the system 10 for delivery at the various devices in the rig.

The system 10 can also include a plurality of variable frequency drives (VFD) 20 shown as VFD1, VFD2, VFD3, and VFD4. It is to be understood that there can be any number of VFDs in a given system. The VFDs 20 receive electrical power from the DC bus 18 and deliver the power to a series of motors 22, shown as M1, M2, M3, and M4. Once again, there may be more or fewer motors than what is shown in FIG. 1 and the aspects of the present disclosure are not limited to the number of components shown and described herein. The motors 22 consume the electrical power received from the VFDs 20 which was first generated at the generators. The motors 22 can be a top drive or a mud pump used in a drilling operation, or they can be any other power-consuming component of the rig, from HVAC to lighting to power tools on the rig floor. Virtually any need of the rig can be provided by the generators 12.

The system 10 also includes a computation component 26 which in some embodiments is operably coupled to the generator bank 12, to the VFDs 20, and the motors 22. In other embodiments the computation component 26 is coupled to the generators, the VFDs 20, or the motors 22, or any combination thereof. The generators can include gauges and sensors that provide readings to the computation component 26 such as power level readings, capacity readings, temperature readings, and any other convenient reading created at the generator bank 12. The VFDs 20 and motors 22 can also include gauges, sensors, and diagnostic equipment configured to provide data relating to the operation of these devices to the computation component 26. The computation component 26 is in some embodiments configured to query the various components of the system 10 when such information is needed for a calculation. In some embodiments the generators 12, VFDs 20, and motors 22 are configured to periodically transmit readings to the computation component 26. Any one or more of the generators, VFDs 20, and motors 22 can be coupled via communication lines 23 to the computation component. The communication lines 23 can be wired or wireless and can be an Ethernet, Bluetooth, WIFI, or any other suitable communication line.

The system 10 also includes a terminal 24 which enables an operator to view information about the system 10 and to make inquiries regarding the status of one or more components of the system 10. For example, an operator such as a drilling operator can access the terminal 24 and request the status of motor M1 and generator G1 via an interface on the terminal 24. This information can enable the operator to make adjustments to the system 10 as needed according to a predetermined well plan or subject to the judgement of the operator.

Many generators such as those of the system 10 have an efficiency curve describing regions of higher and lower efficiency. For example, many such generators operate at highest efficiency at above 80% of capacity. Different generators will have different efficiency curves which data can be stored in a memory of the computation component 26. In some embodiments each generator has a different efficiency curve. In some embodiments, in addition to the preexisting efficiency curve the generator's sensors and gauges can be used to calculate efficiency in real time in which case this information can be used to carry out the system architecture according to embodiments of the present disclosure. The VFDs 20 can also have preferred operating ranges which may be related to higher efficiency or to another suitable parameter. As the system 10 operates, the motors 22 run at different loads depending on which tasks are being carried out by the system 10. In some embodiments the highest loads are caused by the mud pumps or top drive, but the systems and methods of the present disclosure are capable of improving efficiency whatever the load may be.

The computation component 26 is configured to monitor the load on the motors 22 and the capacity of the generators and the operation of the VFDs 20 and to make adjustments based on the efficient operation of these devices. For purposes of explanation and not limitation, suppose that in one embodiment the motors 22 require 1,000 Watts and each generator is capable of producing 1200 Watts. If two generators are running and the load is split between the two generators, each generator will carry half of the load: 500 Watts. The generators are therefore operating at approximately 42% of capacity (500/1200=0.416). The computation component 26 receives this information and is configured to identify that the efficiency curves for the generators suggest that a higher efficiency can be obtained by running only one generator and shutting down the other generator. The computation component 26 can be configured to alert an operator of this situation at which time the operator can execute the change. In other embodiments the computation component 26 can be configured to execute the change automatically. In this example, the first generator will be shut down and the second will remain operating—this time at 83% capacity (1000/1200=0.833). The computation component 26 can be configured to make this calculation in any system regardless of the number of generators available and even when the generators have different capacities.

The driving parameter can be efficiency of the overall system, or it can be time or another suitable parameter. For example, in some embodiments it may be more efficient to start or stop one or more generators, but some jobs need to be completed within a given time even at the cost of generator efficiency. Another consideration is the energy and time cost of starting and stopping a generator. The computation component 26 can be provided with information relating to the load required by the motors 22 and an expected future load. For example, if the motors 22 are operating an oil and gas drilling operation that is expected to continue for hours, the computation component 26 can calculate that the efficiency gains that will be achieved by making a change are worthwhile considering the length of time at which the system 10 will operate under those conditions, while if the job is nearing completion there may be little or nothing to gain from making a change.

Figure 2:
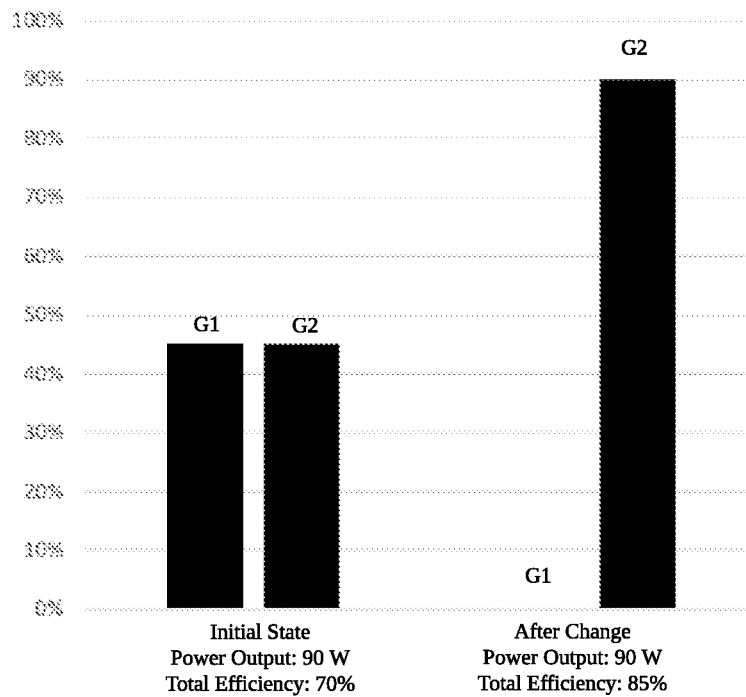
FIG. 2 is a chart depicting generator use according to the systems and methods of the present disclosure.

FIG. 2 is a chart depicting the generator use according to the systems and methods of the present disclosure. The specific numbers shown in these figures are chosen for ease of explanation and not in a limiting sense. The vertical axis represents capacity for G1 and G2 which represent two generators in a system. For ease of calculation the generators produce the same wattage as percent of operating capacity: 100 W at full capacity, 90 W at 90%, etc. In the initial state, each generator is operating at 70% capacity yielding a power output of 90 Watts and a total efficiency of 70%. According to the present disclosure, a computation component can factor in the efficiency of each generator and being informed by data that indicates that these generators are more efficient at a higher operating capacity can change the operation of the two generators. Many generators operate at a higher efficiency nearer to 90% of capacity. The systems and methods of the present disclosure can identify an opportunity to shift the load from two generators running at 45% to a single generator running at 90%. Many systems involving multiple generators are required to load share equally— meaning that a load placed on two generators cannot reasonably be split between the two generators unequally. That is, a configuration of G1 at 30% and G2 at 50% is not desirable or in some cases possible. The systems and methods of the present disclosure can factor in such a limitation or constraint. There may be other constraints or factors that are considered by the computation component of the present disclosure that influence the decision of how to distribute the load amongst the generators. After the change G2 is operating at 90% and G1 is shut down, but the yield is the same total power output of 120 W, but the total efficiency is 85%. After the change, all 90 W are coming from the more efficient G2 (90%) and G1 is shut down resulting in greater overall efficiency gains. The efficiency is weighted by the power output. This is one example of a calculation that can be made to operate generators at a higher overall efficiency. There are many others that will become clear from this disclosure.

Figure 3:
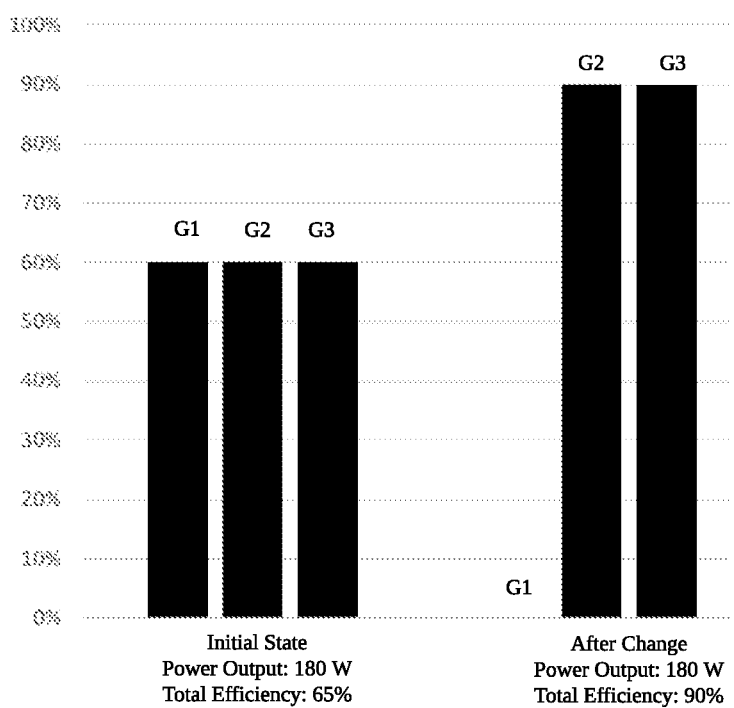
FIG. 3 is another chart depicting generator use according to the systems and methods of the present disclosure.

FIG. 3 is another chart depicting the results of an increase in total efficiency that can be achieved by the systems and methods of the present disclosure. In the initial state there are three generators G1, G2, and G3 each operating at 60% of capacity producing a total of 180 W of power and having a total efficiency of 65%. The computational component can recognize that the generators are more efficient if they operate nearer to 90% of capacity and therefore can either suggest a change to an operator or can execute the change itself. The change is to run G1 and G2 at 90% of capacity and reduce G3 to idle state or to shut off G3 altogether. The result is the same 180 W are produced but at a much more efficient 90%.

Figure 4:
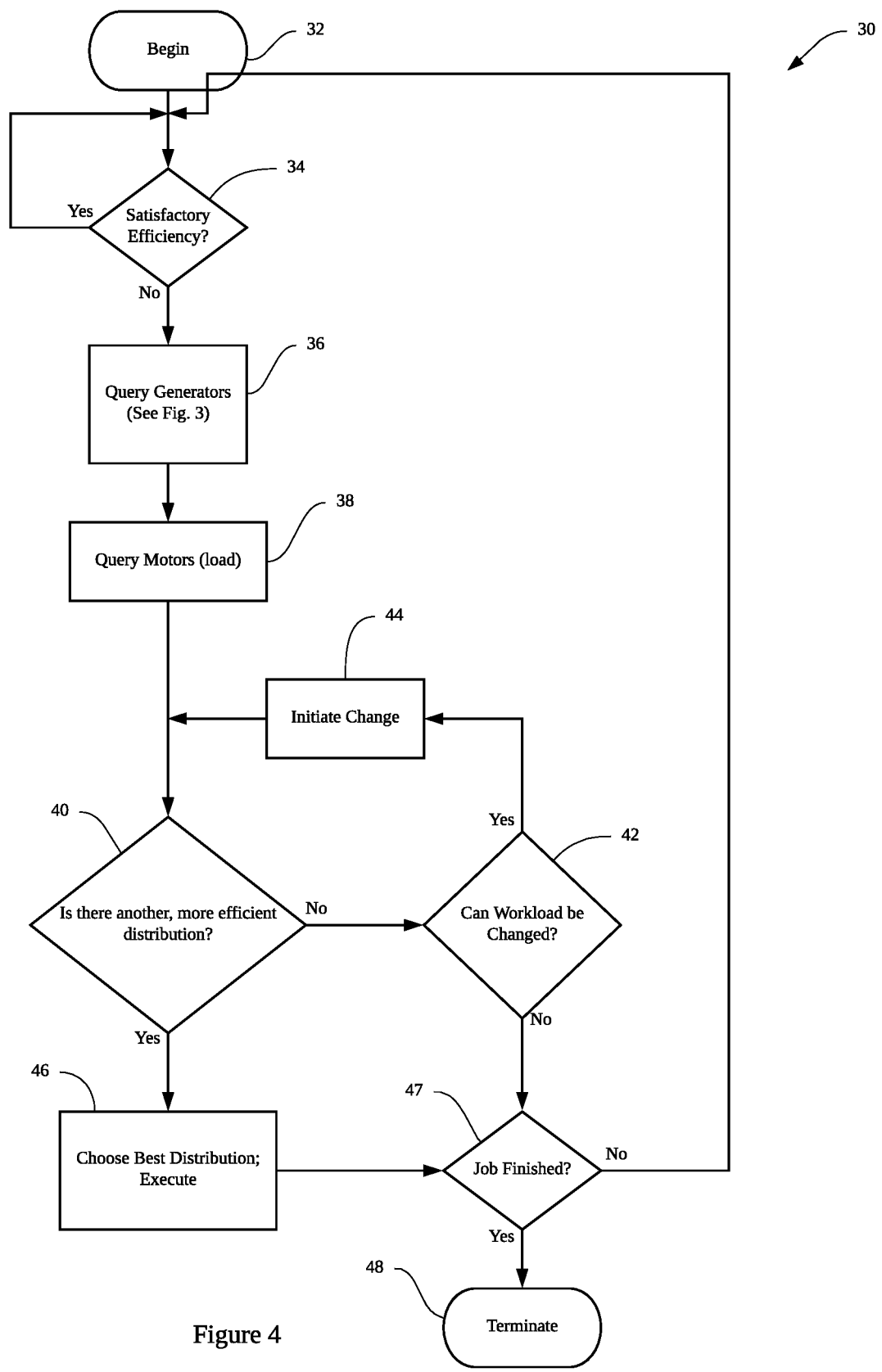
FIG. 4 is a flow chart diagram for a method for efficiently operating a generator system according to embodiments of the present disclosure.

FIG. 4 is a flow chart diagram for a method 30 for efficiently operating a generator system according to embodiments of the present disclosure. The method 30 begins at 32 which can correspond to a true beginning of an operation of the system, or it can represent any arbitrary starting point. At 34 the efficiency of the system is evaluated and compared to a predetermined threshold efficiency level. If the efficiency is higher than the threshold, the method includes periodically repeating this evaluation. The frequency of the evaluations depends on the nature of the system and the ease at which the evaluation can be performed. In some embodiments the evaluation is performed multiple times per second limited only by the natural limits of the computational components used in the system. The efficiency of the system can be an average of efficiency of each running generator, or it can be a weighted average calculated as the product of the efficiency in terms of a percent and the energy produced by each generator. In other embodiments the efficiency is not limited to the efficiency of the generators, but rather that of the system at large. Also, in some embodiments the key parameter can be power throughput rate or another suitable variable. In some embodiments there can be a combination of parameters. For example, the efficiency is calculated but other factors such as power output come into play as well. There may be a power requirement by one of the motors such as a top drive of a drilling rig which requires at least a certain quantity of power below which it cannot or should not operate. Accordingly, despite efficiency gains which may be achieved by making some change, if the change would reduce the power output below this lower limit the change is not performed.

At 36 the generators are queried. Another method is described below with reference to FIG. 5 which can come into play here. The efficiency of the generators can be provided by sensors or gauges at the generators which can send a digital or analog signal to a computation component which can interpret these readings into an efficiency number. At 38 the motors are queried in a similar manner. The load being demanded by the motor or motors can be calculated to determine if a change in generator production is desired.

In addition to the load currently on the motors, a future expected load can also be factored in. At times there are transitory loads which are upon the motors. Adjusting the generator load can in some embodiments entail an energy cost. Starting up a generator or shutting down a generator or making necessary changes to the bus or rectifiers or VFDs or any other component requires some energy. For a transient energy spike it can be determined that the change is not to be made. However, for longer term changes the cost of making the change is less significant compared to the efficiency gains that can be achieved.

After gathering the data from the motors and from the generators, at 40 a check is performed for whether or not there is another, more efficient distribution of the generator load that may be more efficient. The computation component can make these calculations based on the number of generators, the capacity of the generators, and the efficiency curve for each generator. Each generator can have an efficiency curve describing efficiency as a function of capacity. If there are no alternative generator distribution options, at 42 a check is performed for whether or not the workload at the motors can be changed. The workload may have some constraints such as maintaining a rate of penetration for a drilling operation that cannot be altered. In this case the answer is "no" and a check to identify whether or not the job has completed at 47 is performed. If the job continues, control passes back to 34. In some embodiments, however, there are other tasks that can be performed in addition to or in place of current tasks. Suppose for example there are two generators each operating at 80% capacity, but the efficiency of each generator is greater at around 90% capacity. The check at 42 can be to identify any additional tasks that can be performed that would boost the required power output such that the generators can each operate closer to the 90% capacity mark. The additional tasks can be anything from charging a battery, operating some machinery, conducting repairs, or any other suitable extra load. The computation component of the present disclosure can identify these additional tasks and at 44 initiate the cause them to be carried out which will boost the generator's operating rate such that they are closer to the 90% capacity and therefore operate more energy efficiently.

If the check at 40 results in a different generator distribution that would be more efficient, then at 46 the new distribution is identified and executed. As described above, this can mean altering the load of one or more generators, or bringing one or more generators online or offline. After making this change the method can include a check for whether or not the job is complete. If so, the method terminates at 48; otherwise, the method continues by returning control to 34 and the method repeats.

Figure 5:
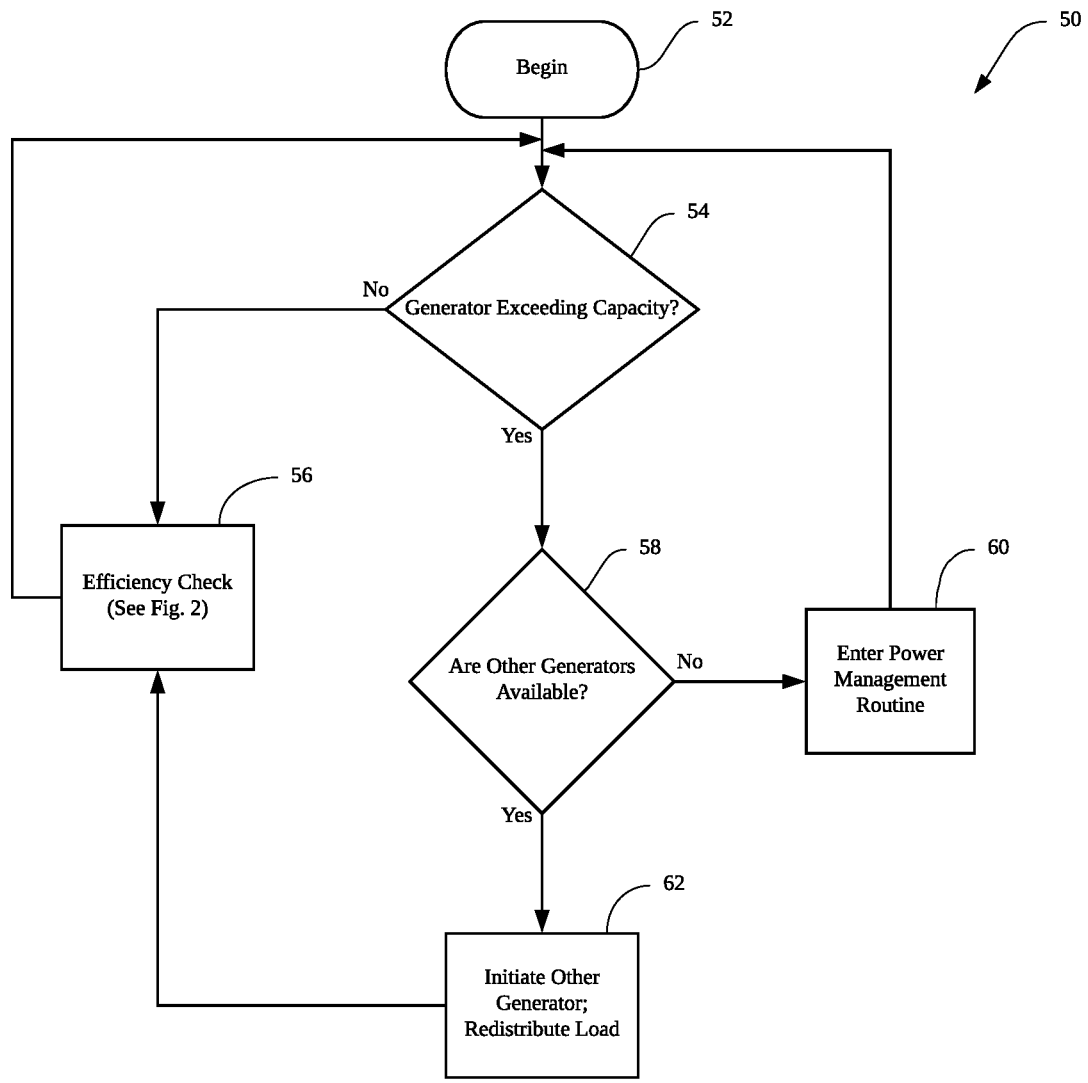
FIG. 5 is another flow chart diagram showing a method for efficiently operating a generator system according to embodiments of the present disclosure.

FIG. 5 is another flow chart diagram showing a method 50 for efficiently operating a generator system according to embodiments of the present disclosure. At 52 the method begins. A check is performed at 54 for one or more of the generators to determine whether or not the generator is exceeding capacity. If not, control passes to 56 to check the efficiency of the operation of the generator. At 56 control can pass to element 36 of FIG. 4 which process is described in detail above. After returning from the efficiency check control can return to 54 to check again the capacity of the generators. This can be performed for each generator individually or for groups of generators.

If any one or more of the generators is exceeding capacity, the method continues at 58 by checking whether or not other generators are available. If there are none, at 60 the method includes entering a power management routine in which processes are shut down or altered in a lowest-to-highest priority routine designed to avoid harming the generators and/or surrounding equipment or personnel. If there are other generators available at 62 the method includes initiating that other generator and redistributing the load among the generators. After or perhaps simultaneously with starting the next generator the efficiency check at 56 (and described further with respect to FIG. 4) can be performed to optimize the generator load taking into account the newly initiated generator. Accordingly, the check for optimization can be initiated by an overloaded generator reading.

Figure 6:
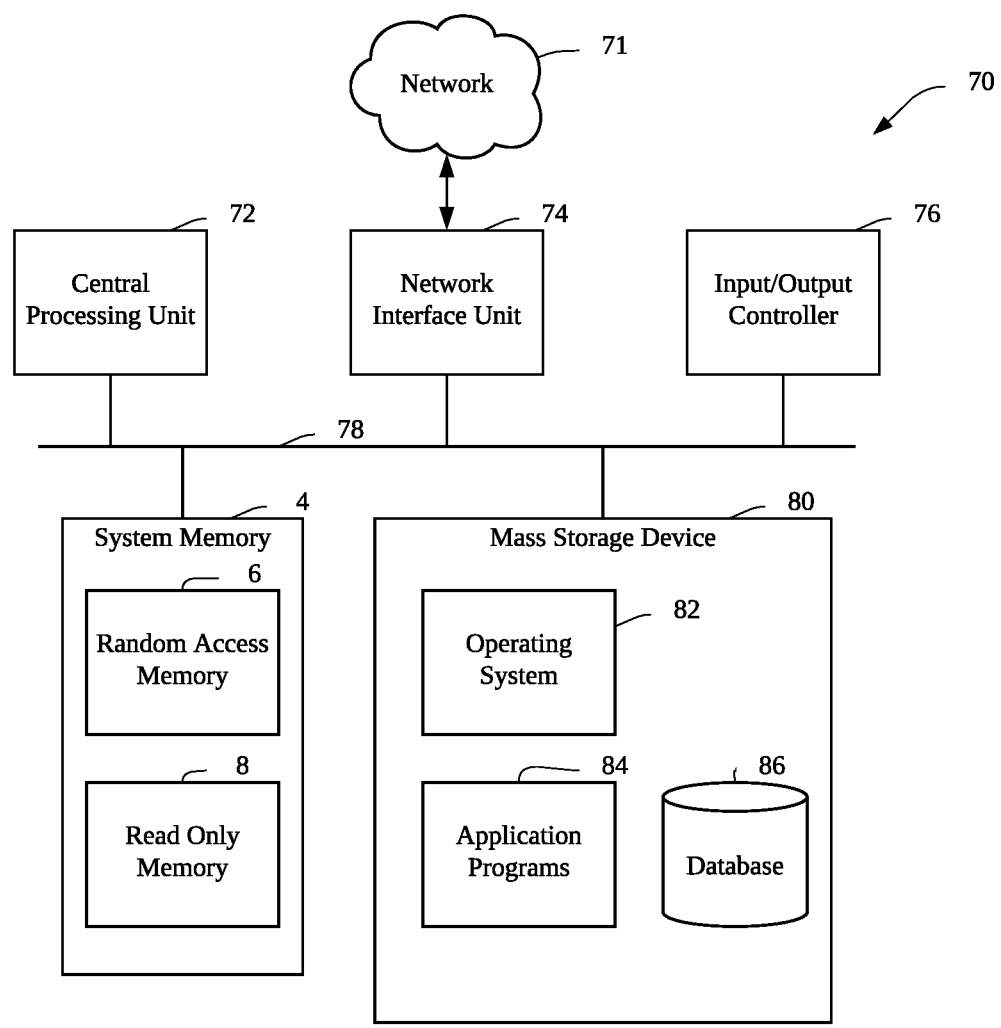
FIG. 6 is an illustrative computer architecture for a computer utilized in the various embodiments.

FIG. 6 is an illustrative computer architecture for a computer 70 utilized in the various embodiments. The computation component described herein can be a computer such as computer 70. The computer architecture shown in FIG. 6 may be configured as a desktop or mobile computer and includes a central processing unit 72 ("CPU"), a system memory 4, including a random access memory 6 ("RAM") and a read-only memory ("ROM") 8, and a system bus 78 that couples the memory to the CPU 72.

A basic input/output system containing the basic routines that help to transfer information between elements within the computer, such as during startup, is stored in the ROM 8. The computer 70 further includes a mass storage device 80 for storing an operating system 82, application programs 84, and other program modules, which will be described in greater detail below.

The mass storage device 80 is connected to the CPU 72 through a mass storage controller (not shown) connected to the bus 78. The mass storage device 80 and its associated computer-readable media provide non-volatile storage for the computer 70. Although the description of computer-readable media contained herein refers to a mass storage device, such as a hard disk or CD-ROM drive, the computer-readable media can be any available media that can be accessed by the computer 70. The mass storage device 80 can also contain one or more databases 86.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 70.

According to various embodiments, computer 70 may operate in a networked environment using logical connections to remote computers through a network 71, such as the Internet. The computer 70 may connect to the network 71 through a network interface unit 74 connected to the bus 78. The network connection may be wireless and/or wired. The network interface unit 74 may also be utilized to connect to other types of networks and remote computer systems. The computer 70 may also include an input/output controller 24 for receiving and processing input from a number of other devices, including a keyboard, mouse, or electronic stylus (not shown in FIG. 1). Similarly, an input/output controller 24 may provide output to a display screen, a printer, or other type of output device (not shown).

As mentioned briefly above, a number of program modules and data files may be stored in the mass storage device 80 and RAM 6 of the computer 70, including an operating system 82 suitable for controlling the operation of a networked personal computer. The mass storage device 80 and RAM 6 may also store one or more program modules. In particular, the mass storage device 80 and the RAM 6 may store one or more application programs 84. The application programs 84 can be related to the operation of the computation component and can determine how the generators are chosen and the workload distributed according to embodiments of the present disclosure.

The foregoing disclosure hereby enables a person of ordinary skill in the art to make and use the disclosed systems without undue experimentation. Certain examples are given to for purposes of explanation and are not given in a limiting manner.

The invention claimed is:

1. A system, comprising:
a generator bank comprising a plurality of individual generators being configured to load share amongst the generators, wherein individual generators have an operating capacity and an operating efficiency, wherein the operating efficiency is a function of the operating capacity, and wherein an efficiency-capacity ratio is a ratio of the operating capacity and the operating efficiency;
one or more motors configured to consume the power produced by the generators by applying a load to the generator bank;
a computation component configured to store data relating to the efficiency-capacity ratio for the generators, wherein the computation component is configured to:
determine whether any of the generators are exceeding their operating capacity;
calculate an overall efficiency of the generator bank;
determine an availability of an alternative power configuration, wherein the alternative power configuration comprises redistributing the load among the generators;
calculate an expected change in the overall efficiency associated with the alternative power configuration when the alternative power configuration is available;
initiate the alternative power configuration using the expected change in the overall efficiency when the alternative power configuration is available; and
enter a power management routine in which processes are shut down or altered in a lowest-to-highest priority routine to avoid damage to at least one of (i) one or more of the generators, (ii) surrounding equipment, and (iii) surrounding personnel when a determination is made that at least one of the generators is exceeding its operating capacity and the alternative power configuration is not available.

2. The system of claim 1 wherein the alternative power configuration comprises one or more of the generators being powered on or off.

3. The system of claim 1 wherein the computation component is further configured to factor in an energy cost of the alternative power configuration.

4. The system of claim 1 wherein the computation component executing the alternative power configuration comprises initiating the changes to one or more of the generators without further human input.

5. The system of claim 1 wherein determining an availability of the alternative power configuration comprises determining whether or not there are unused generators.

6. The system of claim 1 wherein the computation component is further configured to calculate a time period during which the alternative power configuration will operate.

7. The system of claim 1 wherein the computation component is configured to receive a signal from one or more of the generators indicating that the generator is exceeding capacity, and wherein the computation component is configured to determine an availability of the alternative power configuration in which the generator exceeding capacity experiences a reduced load.

8. The system of claim 1 wherein the computation component is configured to factor in a throughput of the generators in a multiplicative relationship with the efficiency of the generators.

9. The system of claim 1 wherein calculating an expected change in the overall efficiency associated with the alternative power configuration comprises utilizing the efficiency-capacity ratio for the generators.

10. The system of claim 1 wherein determining the availability of the alternative power configuration comprises identifying whether or not the load can be changed.

11. The system of claim 1 wherein determining the availability of the alternative power configuration comprises identifying a plurality of alternative power configurations and selecting a best power configuration as the alternative power configuration.

12. A method for operating a generator, the method comprising:
- measuring power output, fuel consumption, and operating capacity at a plurality of generators, wherein the generators are configured to operate together to provide power for a motor;
- determining whether any of the generators are exceeding their operating capacity;
- calculating an operating efficiency for each generator based at least in part upon the power output, fuel consumption, and operating capacity of each generator;
- communicating the operating efficiency with a computation component;
- receiving an instruction from the computation component to redistribute a load on one or more of the generators in response to the instruction; and
- entering a power management routine in which processes are shut down or altered in a lowest-to-highest priority routine to avoid damage to at least one of (i) one or more of the generators, (ii) surrounding equipment, and (iii) surrounding personnel when a determination is made that at least one of the generators is exceeding its operating capacity and the load is not redistributable on the one or more of the generators.

13. The method of claim 12, further comprising calculating a startup energy cost equal to an amount of energy required to start an individual generator, a shutdown energy cost equal to an amount of energy required to shut down an individual generator, and communicating the startup and shutdown energy costs to the computation component.

14. The method of claim 12, further comprising executing a change to one or more of the generators in response to the instruction.

15. The method of claim 12, further comprising sending a signal if the operating capacity exceeds a predetermined threshold, and wherein the computation component is configured to provide the instruction in response to the signal.

* * * * *